(12) United States Patent
Greason (10) Patent No.: US 11,014,651 B1
(45) Date of Patent: May 25, 2021

(54) ENHANCED HIGH-SPEED AIRFOIL PERFORMANCE, INCLUDING INCREASED LIFT/DRAG RATIO, FROM LOCALIZED HIGH-TEMPERATURE SPEED OF SOUND INCREASES, AND ASSOCIATED SYSTEMS AND METHODS

(71) Applicant: Electric Sky Holdings, Inc, Mercer Island, WA (US)

(72) Inventor: Jeffrey Greason, Midland, TX (US)

(73) Assignee: Electric Sky Holdings, Inc., Mercer Island, WA (US)

( * ) Notice: Subject to any disclaimer, the term of this patent is extended or adjusted under 35 U.S.C. 154(b) by 708 days.

(21) Appl. No.: 15/640,212

(22) Filed: Jun. 30, 2017

Related U.S. Application Data (60) Provisional application No. 62/356,914, filed on Jun. 30, 2016.

(51) Int. Cl.
*B64C 23/00* (2006.01)
*F15D 1/00* (2006.01)

(52) U.S. Cl.
CPC .......... *B64C 23/005* (2013.01); *F15D 1/0065* (2013.01)

(58) Field of Classification Search
CPC ....... B64C 23/00; B64C 23/005; B64C 23/04; F15D 1/0065
See application file for complete search history.

(56) References Cited

U.S. PATENT DOCUMENTS

| | | | |
|---|---|---|---|
| 5,676,333 A | 10/1997 | Rethorst | |
| 5,797,563 A * | 8/1998 | Blackburn | B64C 23/00 244/130 |
| 6,527,221 B1 | 3/2003 | Kremeyer | |
| 6,793,177 B2 * | 9/2004 | Bonutti | F02M 69/041 244/78.1 |
| 7,063,288 B1 | 6/2006 | Kremeyer | |
| 7,648,100 B2 * | 1/2010 | Kremeyer | B64C 23/04 244/1 R |
| 8,511,612 B2 | 8/2013 | Kremeyer | |
| 2012/0312923 A1 * | 12/2012 | Chang | B64C 23/005 244/130 |

OTHER PUBLICATIONS

Lu et al., Rotating Detonation Wave Propulsion: Experimental Challenges, Modeling, and Engine Concepts, Journal of Propulsion and Power, vol. 30, No. 5, Sep.-Oct. 2014, 18 pages.
Seebass et al., "Sonic Boom Minimization," Paper presented at the RTO AVT Course on Fluid Dynamics Research on Supersonic Aircraft, Rhode-Saint-Genese, Belgium, May 25-29, 1998, 13 pages.
Wu et al., An Analytical Theory of Heated Duct Flows in Supersonic Combustors, Theoretical and Applied Mechanics Letters, 2014, 5 pages.

* cited by examiner

*Primary Examiner* — Brian M O'Hara
(74) *Attorney, Agent, or Firm* — Perkins Coie LLP (57) ABSTRACT

Enhanced high-speed aircraft performance, including increased lift/drag ratio, from localized high-temperature speed of sound increases, and associated systems and methods are disclosed. A representative method for operating a vehicle includes, while a lifting body of the vehicle is immersed in a gas, heating the gas in a target volume sufficiently to increase the speed of sound in the gas relative to the speed of sound in the gas outside the target volume. The target volume can be positioned adjacent to, forward of, and/or along a pressure surface of the lifting body.

34 Claims, 10 Drawing Sheets

*Maximum lift-to-drag ratio of a conventional supersonic aircraft designed for flight at Mach 2.4 (source: I. Kroo, Unconventional Configurations For Efficient Supersonic Flight p.2).*

*FIG. 1 (Prior Art)*

Maximum lift-to-drag ratio comparison for various hypersonic configurations, illustrating continued decline in L/D even with best known techniques at higher Mach numbers (Source: Anderson at p.920)

*FIG. 2 (Prior Art)*

*In the momentum theory of lift, the slight downward deflection of the air leaving the trailing edge of a wing (ε) produces a downwash of air, which produces lift (source: Wikipedia, Lift-induced drag (accessed 9 April 2016).*

ENHANCED HIGH-SPEED AIRFOIL PERFORMANCE, INCLUDING INCREASED LIFT/DRAG RATIO, FROM LOCALIZED HIGH-TEMPERATURE SPEED OF SOUND INCREASES, AND ASSOCIATED SYSTEMS AND METHODS

CROSS-REFERENCE TO RELATED APPLICATION

The present application claims priority to U.S. Provisional Application No. 62/356,914, filed on Jun. 30, 2016, and incorporated herein by reference.

TECHNICAL FIELD

The present technology relates generally to enhanced high-speed aircraft and other lifting surface performance, including an increased lift/drag ratio, from localized high-temperature speed of sound increases, and associated systems and methods.

BACKGROUND

Several of the remarks below refer to references identified separately under a later heading titled "References."

As a vehicle body moving through a gas increases in speed, the drag on the vehicle increases. There is drag over the body of the vehicle—often called wave drag—caused by the volumetric displacement of air around the body traveling at supersonic or hypersonic speed. For many vehicles, particularly aircraft moving through the atmosphere, the ratio of lift-over-drag (L/D) is a figure of merit, and an important measure of vehicle performance. Typically aircraft designers want an aircraft's L/D to be as high as possible at any given speed. The higher the L/D ratio, the more aerodynamically efficient the body is. (See Anderson at p. 49).

Figure 1:
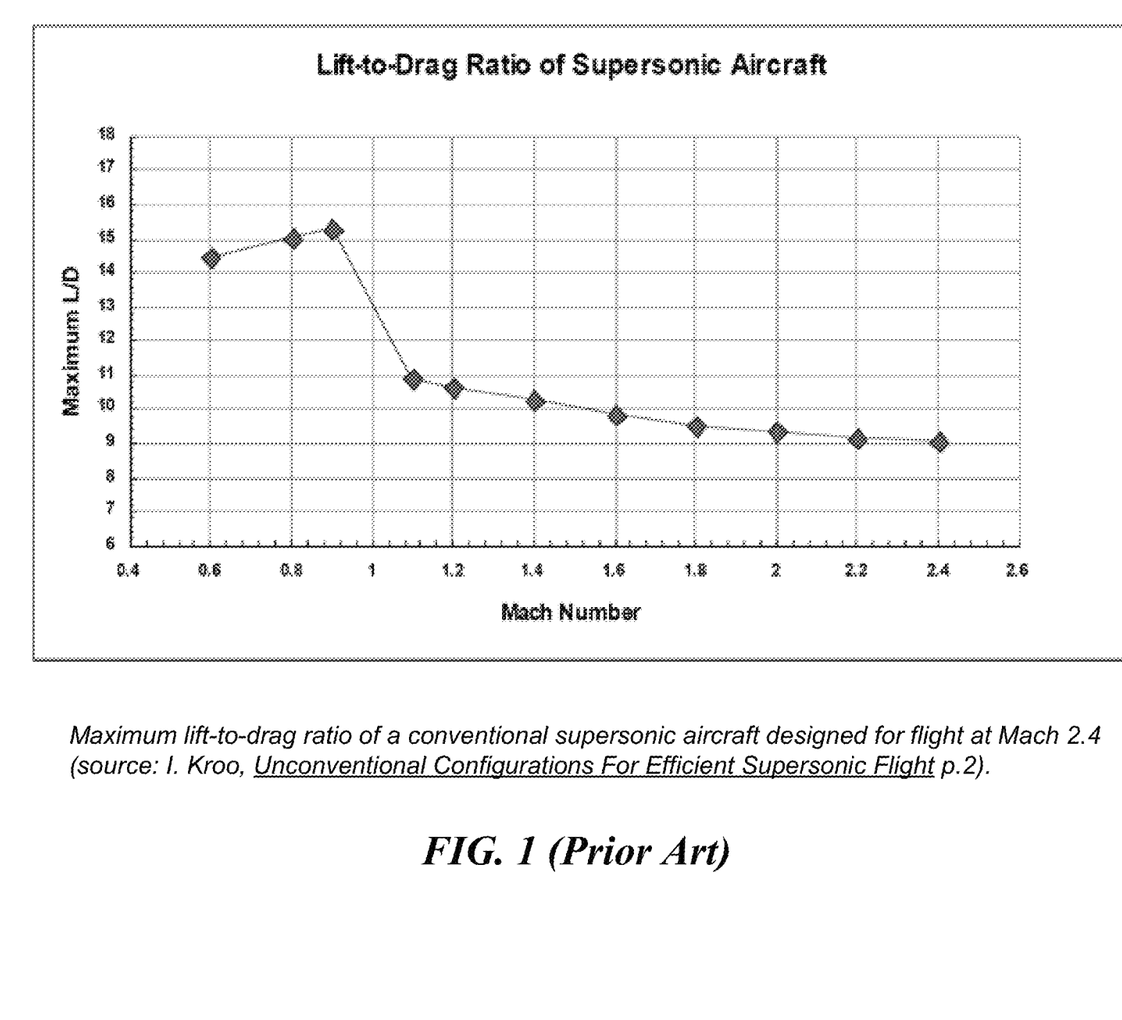
FIG. 1 is a graph illustrating the lift-to-drag ratio of a supersonic aircraft as a function of Mach number.

The L/D ratio of a conventional aircraft drops dramatically in the transonic speed range (roughly from Mach 0.8 to Mach 1.2), and continues to steadily decline as speed further increases. FIG. 1 shows an example of this effect for an aircraft designed for Mach 2.4 flight, with L/D dropping by approximately one-third in the transonic phase and further decreasing to almost half at Mach 2.4.

Figure 2:
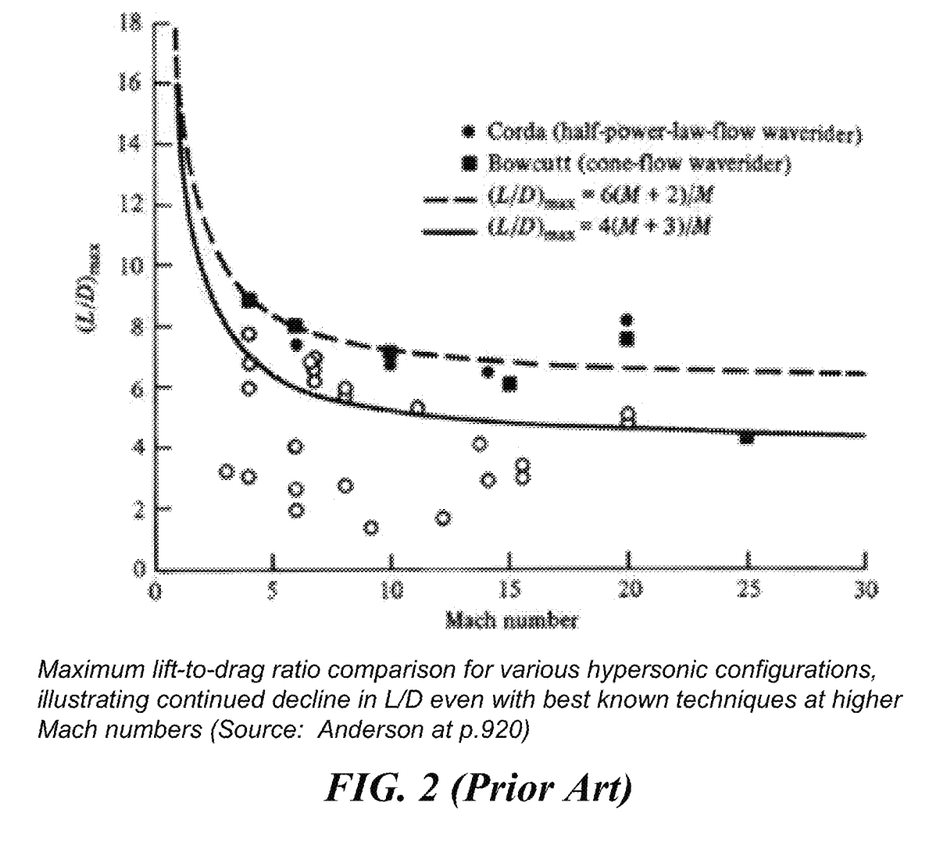
FIG. 2 is a graph illustrating the lift-to-drag ratio as a function of Mach number for a variety of hypersonic configurations.

FIG. 2 demonstrates how L/D continues to decline as speed increases from the supersonic range (above Mach 1) into the hypersonic range (generally considered above Mach 5), even for some of the best known conventional techniques for maximizing L/D.

Several factors contribute to the substantial increase in drag. One of the most substantial factors is supersonic drag due to lift. Vehicles traveling at supersonic speed or hypersonic speed create a compression shock wave in the atmosphere. This compression shock wave can travel significant distances from a moving body (often referred to as the far field), even miles away from the body. This compression shock wave produces several undesirable effects. The shock wave causes an N-wave noise often referred to as a 'sonic boom', which can be annoying to people on the ground who encounter the shock wave. Creation of the compression shock wave also represents a form of drag on the body. The body is in effect dragging the shock wave across the countryside as it travels supersonically.

Various techniques have been attempted in the past to mitigate or eliminate wave drag and far-field shock waves from supersonic and hypersonic bodies. However, these prior attempts have done little to maintain or improve the lift-over-drag ratio for these bodies, and have often had an adverse impact on L/D.

For example, in or about 1935, Adolf Busemann of Germany proposed a double-winged or biplane airframe, in which the two wings were configured in such a way that the shock waves they produced at a given supersonic speed would be generated between the two wings, with each wing deflecting and cancelling out the shock wave from the other wing, mitigating or eliminating the far-field shock wave and thereby minimizing wave drag. However, the biplane configuration proposed by Busemann did not produce lift at the design point zero angle of attack, and so the lift-to-drag ratio was nearly zero.

The U.S. National Aeronautics and Space Administration (NASA) has experimented with altering the physical configuration of a vehicle to change the pressure vs. time profile of a shock wave and thus reduce the perceived loudness of the sonic boom heard on the ground when a vehicle passes through the atmosphere. (Benson, 2013.) Another investigator (Graham, 2016) stated:

"Low-boom design involves shaping the aircraft to produce a series of similar-strength shock waves that do not coalesce and instead produce an S-shaped signature that sounds like a soft rumble, not a loud bang.

Lockheed's design features a long nose to break up the bow shock, the engine inlet above the subtly shaped delta wing for shielding, foreplanes and small horizontal surfaces atop the fin to control the shocks, and a lifting tail placed at the extreme aft of the slender fuselage."

These changes to the physical configuration of the aircraft do not significantly reduce the total energy lost to shock waves and thus are not expected to dramatically improve the vehicle's lift-over-drag ratio.

There have been other attempts to streamline bodies by increasing the ratio of the length of the body to its maximum cross-sectional area, often referred to as the fineness ratio, to minimize the drag on the body when moving through a gas. The Sears-Haack body was developed in the 1940s (independently by Wolfgang Haack and William Sears) as a theoretical model of a structural shape creating the lowest wave drag in supersonic flow. The Sears-Haack body is pointed at each end and grows smoothly from the first end to a maximum cross-sectional area and then decreases smoothly toward the second end. These body-shaping techniques reduce the wave drag but do not address the supersonic drag due to lift, and do not change the far-field shock strength associated with lift, only with the parasitic wave drag of the body.

Later, others proposed using energy deposition to increase the effective fineness ratio of a vehicle. These efforts have met with increasing skepticism from established aerodynamicists. For example, NASA TN D-5582 concluded that "the required power appears to be roughly twice that necessary to sustain the airplane in steady level flight", rendering the concept impractical. Skepticism about energy deposition has grown in the decades since. For example, one prominent aerospace authority noted that "For mass or heat addition (or removal) to be effective in changing the aircraft's equivalent body of revolution, the mass or enthalpy flux added to the flow must be comparable to the aircraft's lift coefficient times the freestream mass or enthalpy flux through an area equal to the aircraft's wing area. This simple observation rules out the practical application of such concepts. Others utilize the known fact that wave drag due to volume, and consequently the sonic boom due to volume, can be eliminated, frequently confusing this with the sonic boom due to lift. This entails the high expense of additional skin friction. And for practical aircraft, the volume is an asset toward reducing the sonic boom, not a liability. The sonic boom due to lift cannot be avoided." (Richard Seebass, 1998, at p. 2)

Riggins proposed depositing energy ahead of a moving vehicle to increase the effective fineness ratio (rather than the structural fineness ratio) of the vehicle, using the energy deposition for drag reduction and directional control, thereby reducing propulsion system requirements. (Riggins, 1999 at p. 462).

Kremeyer discloses in U.S. Pat. No. 8,511,612 using heating to lower the density of the atmosphere in the path of a vehicle, and thereby mitigate the size of the shock wave formed by the vehicle traveling at supersonic speed through that atmosphere. The entire airflow around the body is heated, which can reduce or even eliminate shocks, but the density of the air stream would also be greatly reduced. As an example, for a vehicle traveling Mach 5 relative to the unaltered atmosphere, where the effective Mach number in the heated air is to be kept at a subsonic 0.833 Mach number, the speed of sound in the heated air must be increased six-fold. For ideal gases, that requires an increase of temperature of the square of the change in sound speed, that is, 36-fold increase in absolute temperature of the gas. Assuming the static pressure in the heated column of air to be comparable to the freestream pressure, the density is inversely proportional to temperature and therefore is also 36-fold less than the freestream density. Since lift and drag are both proportional to dynamic pressure (density times velocity squared), the lift and drag would also be reduced 36-fold over freestream conditions. While it is true that the air would be subsonic in the heated column, the 36-fold increase in wing area to produce a given lift would often add so much surface area as to be structurally impractical, and the increased skin area would add considerable skin friction. So while drag would be reduced, there would be a corresponding reduction in lift, and therefore little overall improvement in the ratio of lift-over-drag.

These various approaches either reduce or, in principle, eliminate wave drag, but do not reduce supersonic drag due to lift because they do not substantially improve the far-field turning of the flow (which results in lift) in these systems. As a result, the above approaches do not substantially improve the lift-over-drag ratio of vehicles traveling at supersonic or hypersonic speeds.

Figure 3:
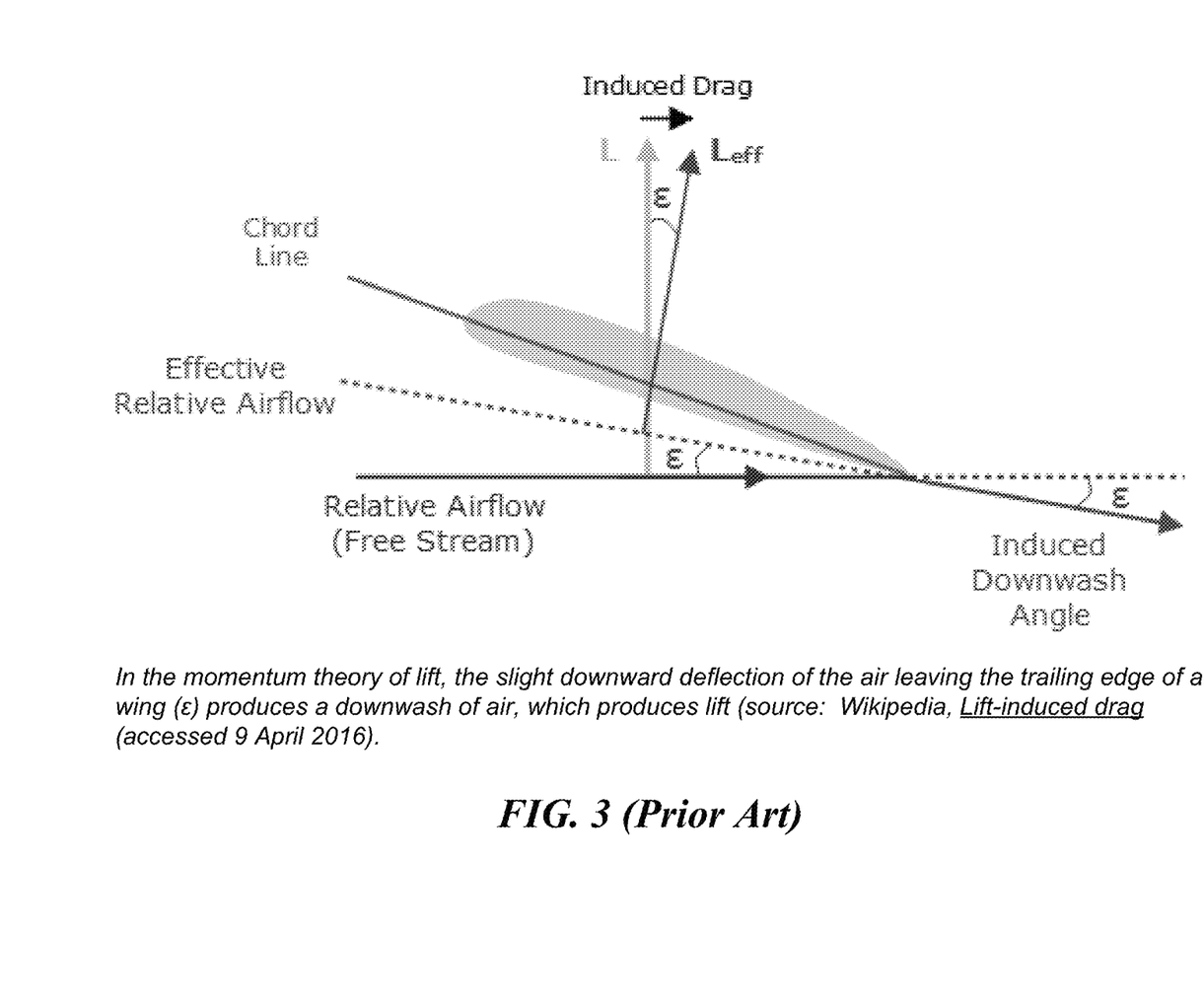
FIG. 3 is a diagram illustrating an airfoil at angle attack, and also illustrating induced drag and induced downwash components.

Fundamentally, aerodynamic lift of a body moving through air involves the generation of a corresponding downward flow of air, often referred to as downwash. Applying standard principles of conservation of momentum, the flow of downwash air results in a lift force on the body moving through the air. Downwash from an aircraft, such as from a moving wing or the body of the vehicle (or propwash from a moving propeller), requires that the airstream going over the body be turned by the process. FIG. 3 shows induced downwash from an aircraft wing moving through the air.

Turning the air induces drag on the body, often referred to as induced drag (See Anderson at p. 430). The pressure drag increases dramatically as the vehicle approaches the speed of sound (Mach 1), as shock waves begin to form and appear in the far field at or above Mach 1. Turning the air generates a compression shock on the lower surface of the body (be that body an aircraft wing or the vehicle itself), or on the area downstream of a propeller. The creation of this far-field shock wave represents a drag on the vehicle's forward movement, which requires greater energy to push the body and the resulting shock wave through the gas (such as air). This higher drag requires more energy to drive the body through the gas, and so has a corresponding effect on the size of the propulsion system and the amount of fuel consumed. Conventional supersonic and hypersonic aircraft typically consume dramatically more fuel than subsonic aircraft when traveling the same distance. For example, the supersonic Concorde aircraft consumed almost three times the fuel required for typical subsonic travel over the same distance. (Kroo, p. 1.)

Local heating under the wing can increase the pressure beneath the wing and thereby enhance lift on the wing. For example, NACA RM E51K26 and NASA MEMO 1-11-59E discuss heating under a wing. In these memoranda, the selection of the area to be heated does little or nothing to reduce formation of the shock wave. In effect, these heating techniques improve only the lift numerator of the lift-over-drag ratio, but do not change the circulation pattern and far-field shock strength, and so do not simultaneously minimize the drag denominator of the lift-over-drag ratio. As a result, the change in overall L/D is small, which is perhaps why these localized heating techniques have not seen widespread adoption in the five decades since they were proposed.

Figure 4A:
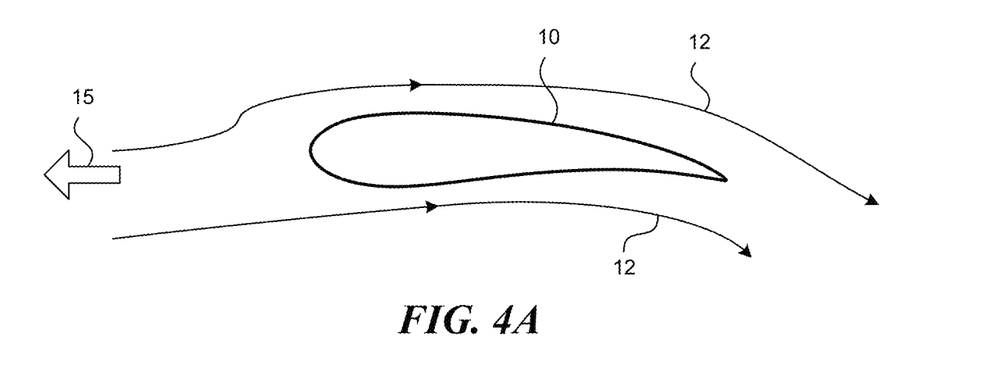
FIGS. 4A-4C schematically illustrate circulation about an airfoil.
Figure 4B:
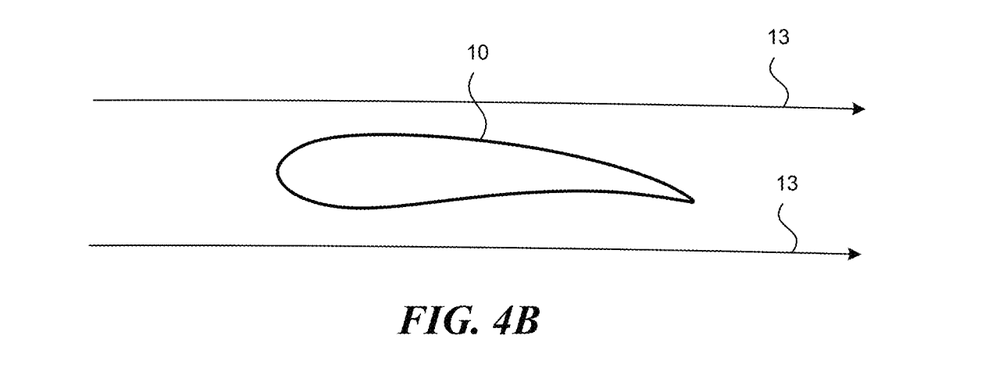
Figure 4C:
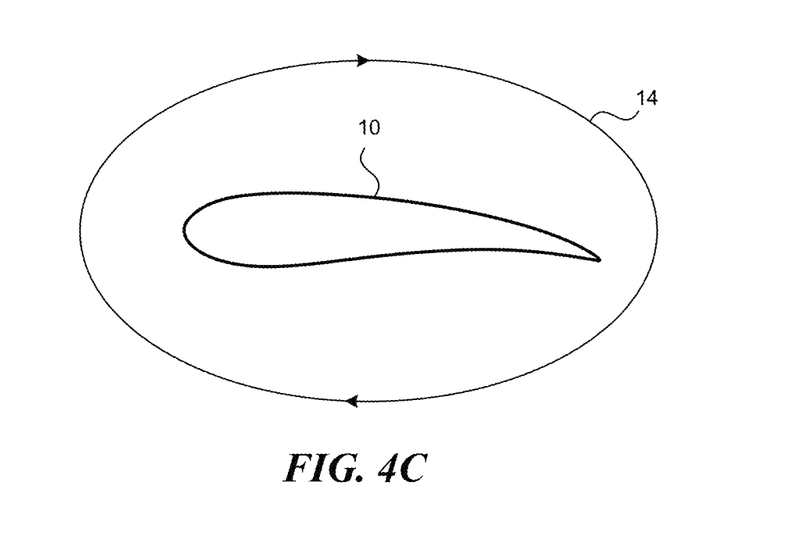

Rethorst (U.S. Pat. No. 5,676,333) outlines a method for mitigating both supersonic drag due to lift and far-field shock production. One of the several methods for the analysis of lifting wings in subsonic flight is the circulation theory, which treats the airflow as a superposition of a linear and circulating flow around the wing, FIG. 4A illustrates an airfoil 10 travelling in a forward direction 15 in an airflow 12, which can be considered as a superposition of the same airfoil in a linear flow 13 (FIG. 4B) and a circular flow 14 (FIG. 4C). As Rethorst points out, in supersonic flow, this circulating flow is interrupted because the portion which flows forward along the underside of the wing does not move through the supersonic flow. This interruption of the circulation mechanism forces the production of a shock to accommodate the interrupted flow. Rethorst adds airflow to energize the stream and make up the missing circulation. The Rethorst approach requires a substantial flow of air to make up for the missing circulation. The machinery necessary to force an adequate flow of air would add substantial weight to the vehicle, which would in turn require greater lift forces on the vehicle to maintain cruising altitude. Accordingly, this appears not to be a practical method, and therefore, there remains a need for improvements in the aerodynamic performance of supersonic vehicles and other lifting devices such as rotating airfoils.

DETAILED DESCRIPTION

Embodiments of the present technology can enhance the lift-over-drag ratio (LID) of a body moving through a gas (including air), at speeds that would otherwise be supersonic or faster, by heating an area on the side of the body generally opposite the desired direction of lift (or opposite the direction of thrust, in the case of a propeller). The area can be heated to a temperature high enough that the speed of sound for the heated gas is higher than the speed of the body moving through the gas. The increased speed of sound in the heated area reduces or eliminates the formation of a compression shock wave in the far field that would otherwise be formed by the body pushing or 'turning' the gas as the body passes through the gas. While compression structures may form close to the body (e.g., due to the complex flow patterns that may occur there), the effects in the far field on drag reduction and noise reduction are expected to produce significant benefits. For example, the heated area can reduce drag by reducing or eliminating the formation of shock waves in the far field, and can simultaneously enhance lift by raising the pressure in the heated area. Any of a variety of suitable methods can be used to heat the area, including a radio frequency (RF) induced plasma between electrodes on the body skin, or a "virtual" conductor forward of the body, such as a laser-guided electrical discharge.

Aspects of the present technology include heating an adequate area on the underside or pressure side of a moving body to a temperature high enough to alter or eliminate the compression shock, simultaneously improving lift under the body and reducing drag. For example, in one embodiment shown in FIG. 5A, a winged vehicle 100 having an airfoil or lifting body 110 moves through the freestream air 120 in a travel direction 115. The heating can be performed from one or more points below the stagnation point P of the airfoil 110. A resulting heated zone or target volume 130 (shown schematically) can extend from below the stagnation point P aft along the lower or pressure surface 111 of the airfoil 110 toward the trailing edge 112. In a particular embodiment, the heating is limited to the region below the stagnation point P, along some or all of the length of the lower surface 111 (e.g., partway or entirely to the trailing edge 112). Accordingly, an upper or suction surface 113 of the airfoil 110 is not heated. In another embodiment, shown in FIG. 5B, the heated zone 130 can extend along the lower surface 111, and can also extend forward of the airfoil 110, and at least partially above and downstream of the stagnation point P. In a particular aspect of this embodiment, the heating can be performed by a guided discharge 140, for example, a focused energy beam that heats the air in the heated zone 130.

Hotter air has a higher speed of sound than cooler air—indeed, the "speed of sound" in air or any gas can be thought of simply as the average speed of molecular motion in the gas. For ideal gases, that follows the formula $c=(kRT)^{1/2}$ where:

"c" is the speed of sound,

"k" is the specific heat capacity per unit of mass of the gas in joules per Kelvin per mole of the gas, "R" is the universal gas constant [equivalent to 8.3144598 (48) of joules per Kelvin per mole of the gas, with the last two digits (in parentheses) representing the uncertainty (standard deviation) of the value, and "T" is the absolute temperature (Kelvin).

Figure 6:
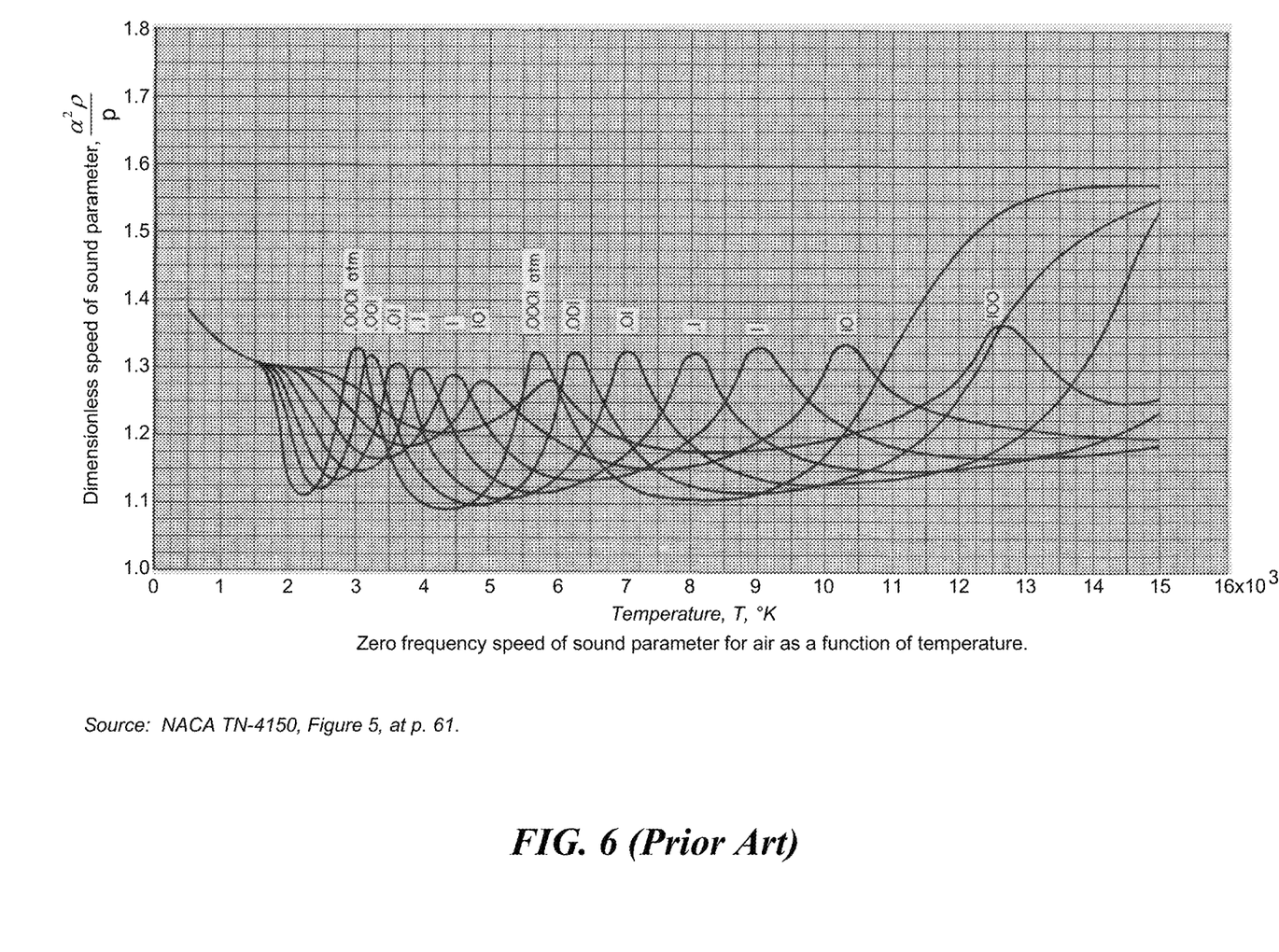
FIG. 6 is a graph illustrating a dimensionless speed of sound parameter as a function of temperature.

As temperature increases, the gas ceases to be ideal, and ionization begins, but the general trend (that higher temperature produces a higher speed of sound) remains. The chart in FIG. 6 illustrates a dimensionless speed of sound parameter as a function of temperature, for a range of pressures. Despite the large temperature range, large pressure range, and multiple ionization events covered by the chart of FIG. 6, the deviation from the general trend of the speed of sound being proportional to the square root of temperature is not more than approximately +/−20%. Accordingly, the effect of ionization on the speed of sound is (relatively) insignificant.

If the gas is heated sufficiently, the speed of sound in the heated gas becomes higher than the speed of the body (e.g., the airfoil 110) moving through the gas. At that point, the circulating flow about the body is no longer held back by sonic limitations, and the gradual turning of the air through the circulation flow field is reestablished. The turning of the air becomes dominated by this gradual turning over some combination of the upper and lower surfaces of the body, rather than by sudden pressure jumps accompanied by strong increases in entropy (i.e. shocks), restoring a lift producing process similar to or the same as that present in subsonic flight. The compression shock wave is therefore reduced or eliminated and supersonic drag due to lift is greatly reduced. This technique increases the lift-to-drag ratio for the body, both by enhancing the lift numerator and decreasing the drag denominator due to far-field shock.

Figure 5A:
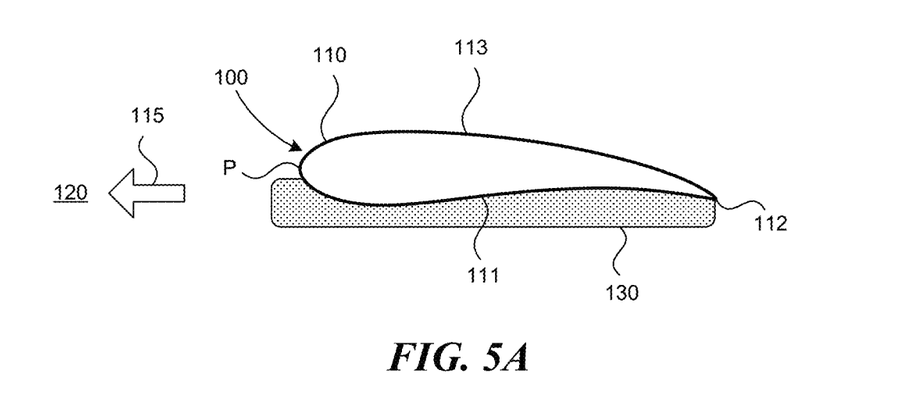
FIGS. 5A and 5B illustrate heated zones around a lifting body, in accordance with embodiments of the present technology.
Figure 5B:
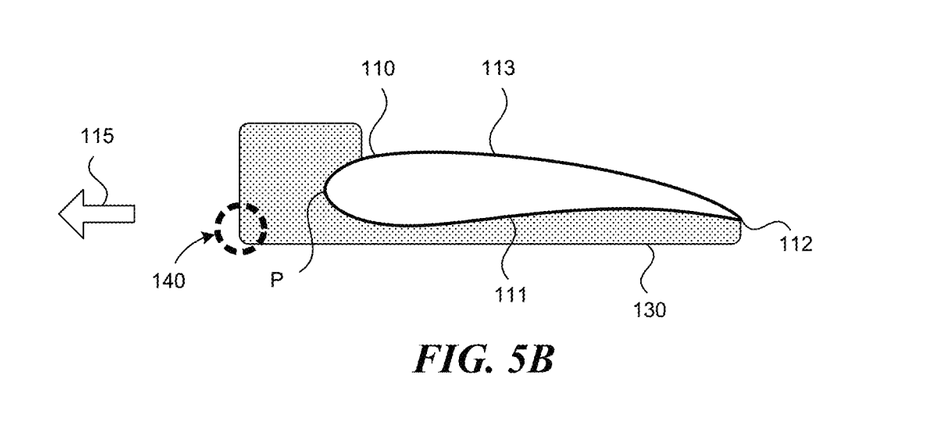

In particular embodiments, it is not necessary to add energy along the entire zone from forward of the stagnation point of a body, along the underside of the body, to the back to the trailing edge of the body (as shown in FIG. 5A). Instead, the energy addition can be more focused, concentrated, or localized, and managed so that the air remains above the required temperature throughout a target zone as described further below with reference to FIGS. 7 and 8. Since the overall flow of air is from front to back (circulation shows up as faster flow on the top than on the bottom, not a complete reversal), energy deposited at the front heats the air which cools only slowly (and therefore continues to have a beneficial effect) as it flows aft. In particular, the cooling effect is expected to be primarily due to diffusion, which is low at typical hypersonic flight altitudes.

The air or other gas can be heated by a variety of suitable techniques. Representative techniques are discussed below, but it will be apparent to one skilled in the art that other suitable techniques can also be used.

Figure 7:
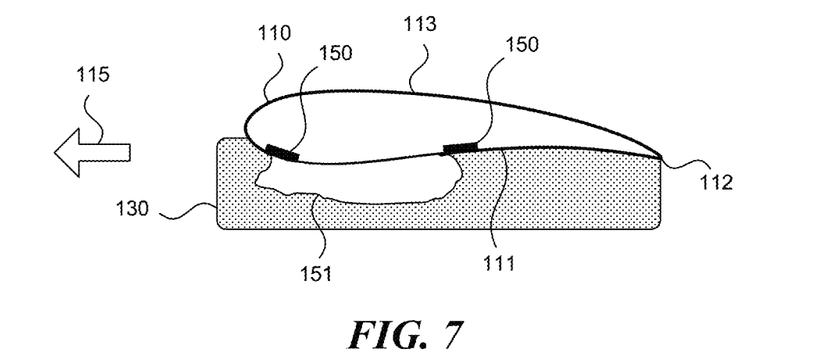
FIG. 7 is a schematic illustration of a lifting body having electrodes, a discharge area, and a heated zone in accordance with embodiments of the present technology.

One approach to heating air is to create a radio frequency (RF) plasma on one side of the body, e.g., between electrodes on the body skin or otherwise positioned to heat the air adjacent to an airfoil. FIG. 7 shows an embodiment of this approach for an airfoil 110 (e.g., an aircraft wing), and in other embodiments, the approach can be applied to a propeller or other body moving through a gas. In this approach, the airfoil 110 includes one or more pairs of electrodes 150 that, when activated, form a discharge area 151 adjacent a surface (e.g., the lower surface 111) of the airfoil 110. The discharge area 151 in turn heats the heated zone 130 to produce the lift and drag benefits described above. The frequency of the electrical discharge used to ionize the air can have a range of suitable values, including 2.4 GHz, 13.56 GHz, and/or 61 GHz.

Figure 8:
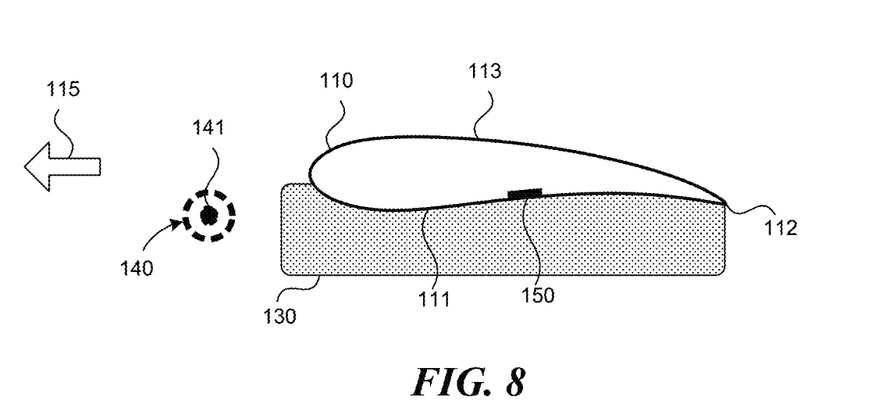
FIG. 8 is a schematic illustration of a lifting body having a laser-guided electrical discharge configuration in accordance with embodiments of the present technology.

Still another approach to heating one side of the body is to employ a "virtual" conductor forward of the body—for example, by a laser-guided electrical discharge. FIG. 8 shows an example of this approach for an aircraft wing or other airfoil 110. In particular, the virtual electrode can be formed by one or more RF discharge beams 140 that are emitted from the airfoil 111, and that extend spanwise in front of the airfoil 110 into and out of the plane of FIG. 8 (as indicated by axis 141, which is viewed end-on). One or more second (non-virtual) electrodes 150 are carried by the airfoil 110 and form a circuit return path. The field produced by the virtual electrode 140 and the physical electrode 150 can form a heated zone that extends along the lower surface 111 of the airfoil 110 (e.g., toward or to the trailing edge 112). Optionally, the heated zone can also extend along the upper surface 113 of the airfoil 110. Representative techniques for providing a virtual conductor are disclosed in U.S. Pat. No. 8,511,612 to Kremeyer, incorporated herein by reference. Both approaches function similarly for purposes of the present technology. However, wings with a finite leading edge radius generate wave drag due to the volumetric displacement of the air by the body of the wing, in addition to generating supersonic drag due to lift. The second method (with the virtual conductor) can effectively sharpen the wing tip (lowering the effective fineness ratio of the wing), offering further drag reduction.

In particular embodiments, heat can be added by combustion, at modestly supersonic speeds, or with swept wings; such techniques are limited by the combustion temperature of available fuels. The fuel can be ejected forward of the wing and below the lower surface if this technique is used. Heat addition by combustion generally requires the chordwise component of air flow over the wing to be slow enough that the combustion process has time to take effect. That limits the aircraft speed to more modestly supersonic speeds. The technique of sweeping the wings reduces the chordwise airflow speed, so a swept wing can extend the usefulness of combustion heating to somewhat higher Mach numbers. At still higher Mach numbers, electromagnetic or discharge heating will be used in particular embodiments. In other embodiments, power is extracted from a thrust-producing propulsion system (e.g., one or more turbine engines), and is then used to generate electricity, which powers an RF generator and/or laser. In still further embodiments, power may be provided by a magnetohydrodynamic generator operating on gases in a ramjet, or the power may be provided by an external source such as a microwave or millimeter wave beaming power to the vehicle.

As an example of the feasibility of this heating technique, consider an unswept wing moving through air having a freestream temperature of 2500 K (Kelvin), at a freestream Mach number of 5. To bring the Mach number along the underside of the wing to 0.833, approximating the gas as ideal, the temperature is raised 36 fold (to 9,000° K) in a particular embodiment. Using conventional heating techniques can include using electromagnetic energy. Correcting for real-gas effects on the speed of sound can increase the target temperature of the gas to 10,000° K, depending on pressure. While the enthalpy of air is a highly nonlinear function at such high temperatures, the specific heat increase of the air is roughly six fold over such a temperature range in the 0.1-1 atmosphere pressure range. That then implies a total energy input on the order of 36 kJ/kg of air to raise it to this temperature.

Assuming the wing has a one meter chord and 20 meter span ($S_{ref}$), unswept, at an altitude of 24,384 meters (80,000 feet), a pressure of 2760 Pascals, a density p of 0.043 kg/m³, and a temperature of 221° K, the speed of sound will be 298 m/s (meters per second). Under these conditions, a freestream velocity V of 1490 m/s corresponds to Mach 5 in the freestream. When accounting for skin friction and parasitic drag in subsonic flight, such a wing can approach an L/D of 20. At a lift coefficient ($C_l$) of 0.2, the lift generated would be $C_l*0.5*\rho*V^2*S_{ref}$, or approximately 191,000 Newtons. If only such a vehicle could achieve an L/D of 20, which is readily attainable in subsonic flight, drag would then be approximately 9,540 Newtons. Thrust power required to overcome that lift would be Drag*Velocity, or approximately 14.2 Megawatts, using conventional techniques in subsonic flight. Given the much lower L/D present in supersonic flight in the prior art, a more representative L/D would be 6, which would increase the drag to approximately 31800 Newtons, and the thrust power to overcome that drag would be approximately 47.4 Megawatts. In other words, using existing techniques, the additional power required to fly at Mach 5 due to the degradation in L/D compared to subsonic speeds is the difference between 47.4 Megawatts and 14.2 Megawatts, or 33.2 Megawatts.

The following calculation provides an example of how embodiments of the present technology can achieve a similar effect (on L/D of about 20) with much less power. Consider as a simplifying approximation that to achieve the desired effect, a rectangular box of air having a length equal to wing chord and height equal to one quarter the wing chord is heated to a uniform 10,0000 K. A real heating profile is unlikely to be so simple or uniform, but this is a useful approximation for a simple estimate of the magnitude of energy required. The density of air (p) in the heated zone will be lowered by the heating process, but enough energy to maintain the high temperature is supplied. The heated air flows aft off the trailing edge of the wing. Therefore, one can consider the mass flux flowing in to the front of the box as being captured by a bounding box with span equal to the airfoil wingspan and a height equal to the quarter chord—in this case, 20 m×0.25 m. The downwash can be denoted by w. At freestream conditions, the mass flux of incoming air is w*h*ρ*V, or about 16 kg/s. With the energy input of 36 kJ/kg of air to heat to 10,000° K, the heating power is approximately 0.57 megawatts, or only approximately 4% of the total thrust power (e.g., 14.2 megawatts as determined above) required to achieve roughly the same L/D. The added power of 0.57 megawatts is a significant reduction compared to the 33.2 megawatt additional thrust power required for conventional techniques described above. This simplifying approximation demonstrates the practicality of the method of heating air under the wing or other body for increasing aerodynamic efficiency at supersonic and hypersonic speeds. Even if the energy conversion for heating is only 50% efficient (and so fuel consumption increases by 8% rather than 4%) to power the heating apparatus, the resulting overall vehicle power requirement is comparable to that achieved by an L/D of 18.5, compared to the practical subsonic L/D of 20. The 'effective' L/D of 18.5 is many times greater than other techniques for Mach 5 flight.

Figure 9:
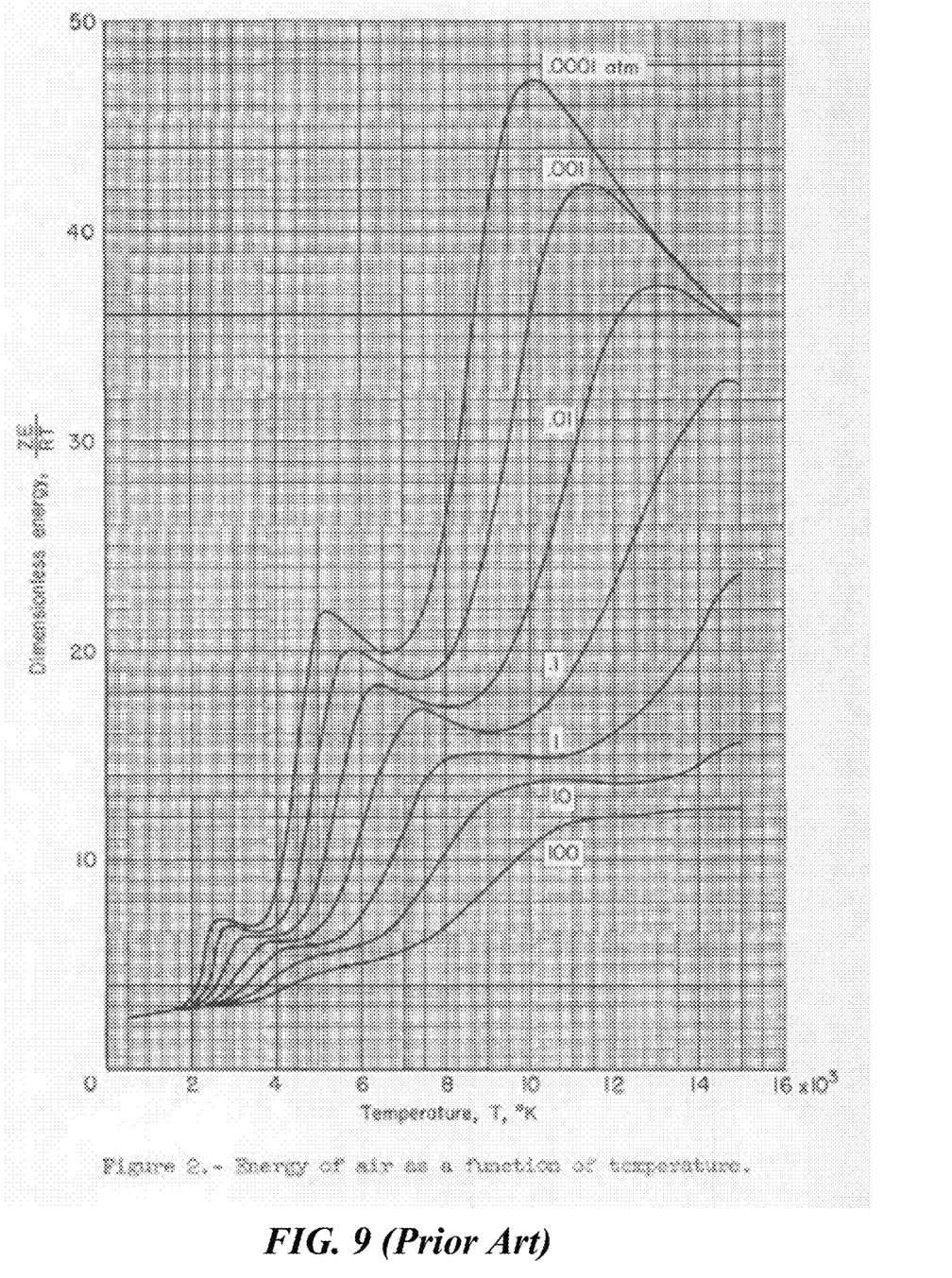
FIG. 9 illustrates a dimensionless energy quantity as a function of temperature.

FIG. 9 shows the energy of air as a function of temperature and indicates that, while ionizing air at the temperatures described above requires more energy than would be predicted assuming an ideal gas, the energy levels remain practical.

In another embodiment, the heated zone can be intensely heated, to create a low density zone having pressure reflecting characteristics. In particular embodiments, the low density heated zone is constrained to a very thin layer offset downwardly below the wing or other lifting body. For example, the heating can be concentrated in a layer that is about 1 mm thick or less. The strong heating in this layer can produce density changes that not only produce pressure waves in the free stream supersonic flow, but can reflect the pressure waves. Accordingly, when such a layer is positioned below the airfoil lower surface, the result of the energy deposited in the heated zone is a pressure increase on the underside of the wing. In addition, the reflected shock or shocks add to the pressure increase (e.g., lift), so that the net effect may be a greater level of lift than in the embodiments described above, for the same level of heating power.

Figure 10:
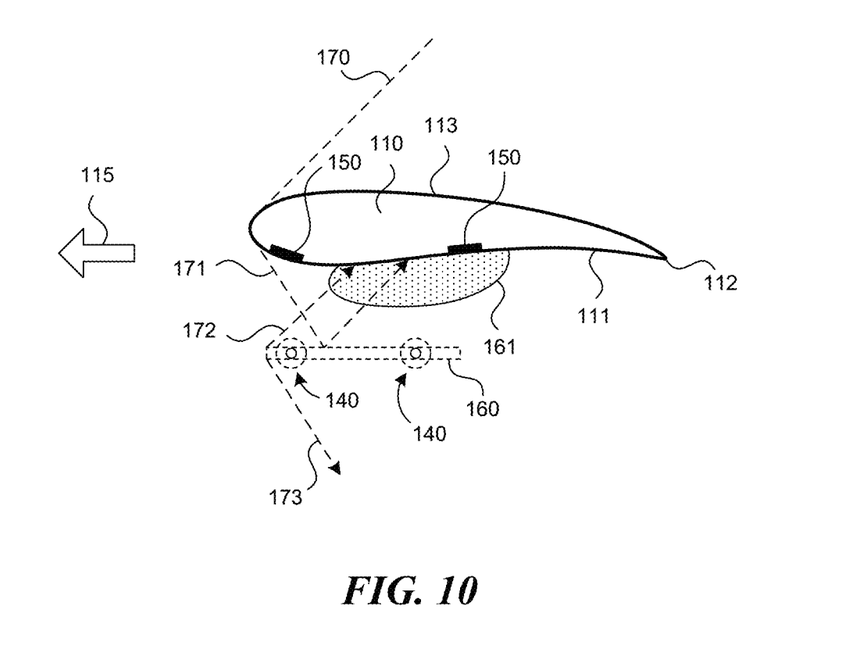
FIG. 10 is a schematic illustration of a lifting body that produces an intensely heated, low density zone for reflecting shocks in accordance with embodiments of the present technology.

FIG. 10 is a partially schematic cross-sectional illustration of a representative airfoil 110 that generates upper and lower airfoil shocks 170, 171. The airfoil 110 can be equipped to produce a low-density heated zone 160 below the airfoil lower surface 111, as illustrated schematically in FIG. 10. The low-density heated zone 160 can be formed via one or more guided discharges 140. The low-density heated zone 160 can add to the lift of the airfoil 110 via two mechanisms. First, the low-density heated zone 160 can itself generate upper and lower heated zone shocks 172, 173. The upper heated zone shock 172 can impinge on the lower surface 111 of the airfoil 110 to create a high pressure zone 161. In addition, the low-density heated zone 160 can be positioned to reflect the lower airfoil shock 171 so that it, too, impinges on the airfoil lower surface 111 at the same or a different high pressure zone 161. In this manner, the lift on the airfoil 110 can be significantly augmented, without significantly adding to the airfoil drag. Because the energy requirement for creating the low-density heated zone is large, the heated zone 160 can be very thin (as described above) so as to reduce energy consumption.

In operation, the heat at the low-density heated zone 160 is provided at a high enough intensity that the local air density is significantly reduced. By heating the air very quickly, the air density drops, and as the air density drops, the amount of air that requires heating decreases. As a result, this technique can be used to generate a very strong density gradient. It is the strong density gradient that reflects the lower airfoil shock 171, as shown schematically in FIG. 10. In the limit, the heating can be so intense that air is nearly completely evacuated from the low-density heated zone 160 and the zone approaches a vacuum. Since a pressure wave (including the lower airfoil shock 171) cannot cross a complete vacuum, the shock is reflected, either partially or completely, depending on how low the air density is in the low-density heated zone 160.

Figure 11A:
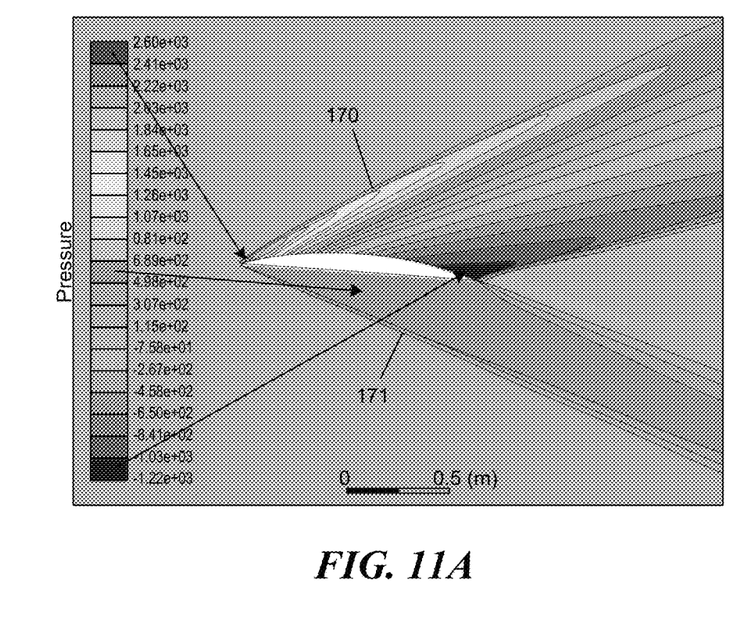
FIGS. 11A and 11B illustrate computer fluid dynamic simulations of the pressure distribution around an airfoil with and without an intensely heated, low density zone configured in accordance with embodiments of the present technology.
Figure 11B:
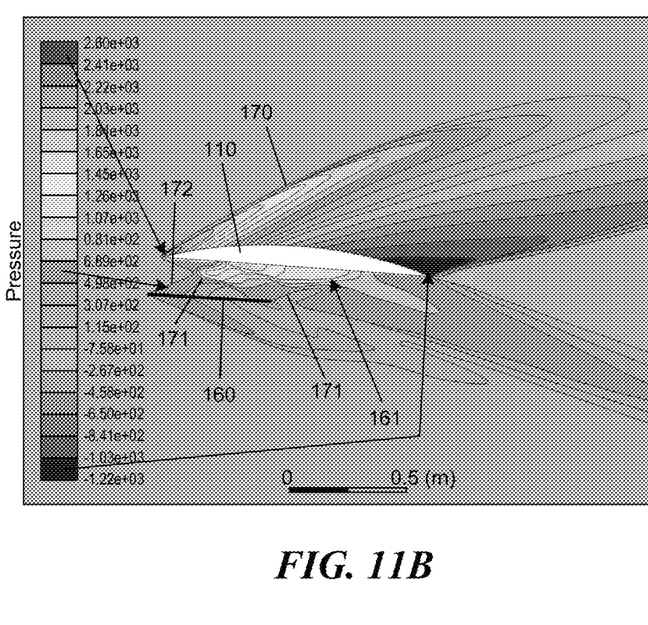

FIGS. 11A and 11B illustrate a computer fluid dynamics (CFD) simulation of a sharp leading edge airfoil 110 without a low density heated zone 160 (FIG. 11A) and with a low density heated zone 160 (FIG. 11B). As shown by comparing FIGS. 11A and 11B, the presence of the low density heated zone 160 creates both an upper heated zone shock 172 and a reflected lower airfoil shock 171, which together produce a high pressure zone 161 that enhances the lift of the airfoil 110 in the manner described above.

In particular embodiments, the low density heated zone can follow the local streamline direction so that the heat, which travels downstream via convection, is used efficiently. Accordingly, the specific design of the shape of the heat deposition region can be developed in a manner that accounts for the interaction between the shocks generated by and reflected by the wing and the heated zone, and the effect that they have on the local airflow direction. Put another way, the presence of the low density heated zone can change the airflow direction and, to improve efficiency, the low density heated zone should align with the airflow direction while the zone is being heated. That direction may well be different from the airflow direction in the absence of heating.

Accounting for the foregoing interaction may take one or more of multiple forms. For example, the foregoing effect can be accounted for when designing the heated region, including the rate at which heat is deposited into different portions of the system that generates the low density heated zone. Suitable computational fluid dynamic techniques and/or experimental techniques can be used, e.g., in an iterative fashion, to produce the desired solution. In addition to or in lieu of accounting for these effects in the initial design, the system can include a feedback loop that actively directs heat to the appropriate portions of the low density heated zone in a spatially and temporally varying manner, to produce efficient results over multiple conditions. The most efficient result may vary from condition to condition (e.g., from one Mach number to another). Accordingly, the ability to adjust the system parameters in flight may further improve system efficiency.

One feature of at least some of the embodiments described above is that heating the lower or pressure surface of an airfoil, e.g., in addition to heating the air forward of the airfoil, can increase the local speed of sound sufficiently that what would otherwise be supersonic air velocities in the free stream, are instead subsonic velocities within the heated region. The heating process does not result from compression or frictional heating (both of which result from propelling the aircraft through the air) but instead results from energy delivery into the airstream from an energy source onboard the aircraft. As described above, representative techniques for accomplishing the heating include directing laser energy into the air proximate to the lifting surface, and/or electrically heating the air adjacent to the lifting surface, and/or combusting a fuel to locally heat the air adjacent to the lifting surface. As a result, the drag losses experienced at supersonic velocities can be reduced. In addition, as discussed above, the lifting forces on the airfoil can be increased, e.g., as a result of heating the lower or pressure surface. An advantage of this arrangement is that the efficiency of an aircraft or other vehicle that includes these features can be significantly increased, thus enabling vehicles to travel at what are effectively supersonic speeds (relative to the far field) with fuel consumption efficiencies more akin to those typically associated with travel at subsonic speeds. A further advantage of at least some of these embodiments is that, as discussed above, the strength of the shocks typically associated with supersonic travel can be reduced or eliminated. This result may have the further effect of allowing the current prohibition of commercial supersonic flights over land to be relaxed.

A further feature of at least some of the foregoing embodiments is that the heating effect on the airfoil can be limited to some or all of the lower surface, and can accordingly eliminate heating at the upper surface (e.g., above and aft of the stagnation point). An advantage of this approach is that it can achieve the enhanced L/D effects described above, with a reduced energy output.

In still further embodiments, as discussed heating can be used to locally lower the air density near the airfoil by an amount great enough to reflect shocks generated by the airfoil. This technique can be used to enhance the airfoil lift without significantly increasing drag, at supersonic freestream velocities.

From the foregoing, it will be appreciated that specific embodiments of the present technology have been described herein for purposes of illustration, but that various modifications may be made without deviating from the disclosed technology. For example, several embodiments were described above in the context of supersonic aircraft, for which the wings or other fixed airfoils travel at what would otherwise be supersonic speeds. In other embodiments, similar technologies can be applied to other surfaces that may also be restricted and/or inefficient at supersonic speeds, and which can be significantly more efficient when operating in a heated gas envelope with a significantly increased speed of sound. Representative surfaces include a propeller blade or a helicopter rotor blade, or a blended wing/body surface. In still further embodiments, aspects of the foregoing technologies can be applied to vehicles that travel in gases other than air.

In a representative embodiment, the air along the entire pressure surface is heated (e.g., from leading edge to trailing edge, and across the entire span). However, as discussed above, this does not require active heating elements over the entire pressure surface. Instead, the air can be heated in one or more localized regions, and the transport of that heated air aftward can be relied on to provide heated air over the entire pressure surface.

In some embodiments, the energy used to generate the heat for the heated region or heated zone is carried onboard the aircraft, e.g., in the form of fuel which is combusted or converted to electrical energy, which is then used to provide heating. In other embodiments, the energy can be directed to the aircraft from off-board the aircraft while the aircraft is in flight (e.g., via electromagnetic radiation). In general, the process of converting energy to heat is conducted on-board the aircraft, and accordingly, the heat source is generally carried onboard the aircraft.

Certain aspects of the technology described in the context of particular embodiments may be combined or eliminated in other embodiments. For example, in particular embodiments, a turbofan or turbojet engine can be used to generate the power required to heat the air adjacent to the airfoil. In other embodiments, other suitable devices can provide both thrust and power for generating the foregoing temperatures. Such embodiments can include ramjet engines. In particular embodiments, lasers can be used alone to generate increased temperatures. In other embodiments, other devices (e.g., electrical discharge devices) can be used alone or in combination with lasers to generate the temperatures described above. Particular examples were described above in the context of a Mach 5 vehicle. In other embodiments, similar techniques can be applied to vehicles traveling at other speeds that, without the foregoing technology, are above or below Mach 5.

Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly described or shown herein.

To the extent any materials incorporated herein by reference conflict with the present disclosure, the present disclosure controls.

REFERENCES

Anderson, J. D. Jr., *Fundaments of Aerodynamics* ($6^{th}$ Edition, McGraw-Hill Education c. 2017 [sic] Kindle edition purchased 10 Apr. 2016]

National Advisory Committee for Aeronautics (NACA) Research Memorandum (RM) E51K26 *Pressure Distribution and Aerodynamic Coefficients Associated With Heat Addition To Supersonic Air Stream Adjacent To Two-Dimensional Supersonic Wing*, by Pinkel, I. I., Serafini, J. S., and Gregg, J. L. (14 Feb. 1952)

NACA Technical Note (TN) 4150, *Approximations For The Thermodynamic And Transport Properties of High-Temperature Air* by Hansen D. F. (March 1958)

National Aeronautics and Space Administration (NASA) Memorandum 1-11-59E, *Experimental Investigation Of Aerodynamic Effects Of External Combustion In Airstream Below Two-Dimensional Supersonic Wing At Mach 2.5 and 3.0*, by Dorsch, R., Serafini, E. A. F., Fletcher, E. A., and Pinkel, I. I. (March 1959)

David S. Miller & Harry W. Carlson, *A Study Of The Application Of Heat Or Force Fields To The Sonic-Boom-Minimization Problem*, NASA Technical Note TN D-5582 (December 1969)

Richard Seebass, *Sonic Boom Minimization*, p. 2 (1998), paper presented at the North Atlantic Treaty Organization (NATO) Research and Technology Organization (RTO) AVT Course on *Fluid Dynamics Research on Supersonic Aircraft* held in Rhode-Saint-Genèse, Belgium, 25-29 May 1998, and published in RTO EN-4

Rethorst, S., Supersonic Aircraft Shock Wave Energy Recovery System, U.S. Pat. No. 5,676,333 (issued 14 Oct. 1997)

Riggins, D., Nelson, H. F., and Johnson, E., *Blunt-Body Wave Drag Reduction Using Focused Energy Deposition* (AIAA vol. 37, No. 4, p. 460 (received by AIAA for publication on 12 Oct. 1998; published April 1999)

Kremeyer, K., Shock Wave Modification Method, Apparatus, and System, U.S. Pat. No. 6,527,221 (issued 4 Mar. 2003, based on provisional application filed 31 May 2000)

Kremeyer, K., Shock Wave Modification Method And System, U.S. Pat. No. 8,511,612 (issued 20 Aug. 2013, based on provisional application filed 31 May 2000)

I. Kroo, Unconventional Configurations For Efficient Supersonic Flight, published in *VKI lecture series on Innovative Configurations and Advanced Concepts for Future Civil Aircraft* (6-10 Jun. 2005)

Wikipedia, Lift-induced drag (accessed 9 Apr. 2016)

Benson, Lawrence R., *Quieting the Boom: The Shaped Sonic Boom Demonstrator and the Quest for Quiet Supersonic Flight:* 2013, NASA Warwick, Graham, *Lockheed To Begin Design Of NASA's Low-boom Supersonic X-plane*, Aviation Week & Space Technology (29 Feb. 2016)

I claim:

1. A method for operating an aircraft having a lifting body, the lifting body having an upper surface comprising a suction surface and a lower surface comprising a pressure surface positioned opposite the suction surface, the method comprising:

activating a heat source onboard the aircraft; and
while the lifting body of the aircraft is aloft, heating air, via the heat source, in a target volume adjacent to, forward of, and along the entirety of the pressure surface of the lifting body, sufficiently to increase the speed of sound of air inside the target volume, relative to the speed of sound in air outside the target volume;
wherein heating the air excludes heating air adjacent to the suction surface.

2. The method of claim 1 wherein the aircraft is traveling at a velocity when aloft, and wherein heating the air raises the temperature of the air from a first temperature at which the velocity is supersonic to a second temperature at which the velocity is subsonic.

3. The method of claim 1 wherein the aircraft is traveling at a velocity when aloft, and wherein heating the air raises the temperature of the air from a first temperature at which the velocity is hypersonic to a second temperature at which the velocity is subsonic.

4. The method of claim 1, further comprising directing the aircraft aloft.

5. A method for operating a vehicle having a lifting body, the lifting body having an upper surface comprising a suction surface and a lower surface comprising a pressure surface positioned opposite the suction surface, the method comprising:
while the lifting body of the vehicle is immersed in a gas, heating the gas in a target volume adjacent to, forward of, and along the entirety of the pressure surface of the lifting body, sufficiently to increase the speed of sound in the gas within the target volume, relative to the speed of sound in the gas outside the target volume;
wherein heating the gas excludes heating gas adjacent to the suction surface.

6. The method of claim 5 wherein the vehicle is traveling at a velocity when in the gas, and wherein heating the gas raises the temperature of the gas from a first temperature at which the velocity is supersonic to a second temperature at which the velocity is subsonic.

7. The method of claim 5 wherein heating the gas includes directing a laser beam into the gas.

8. The method of claim 5 wherein heating the gas includes directing an RF energy beam into the gas.

9. The method of claim 5 wherein heating the gas includes discharging electrical energy into the gas.

10. A vehicle system, comprising:
an aircraft having a lifting body for moving through a gas, the lifting body having an upper surface comprising a suction surface and a lower surface comprising a pressure surface positioned opposite the suction surface;
an energy delivery system carried by the lifting body and positioned to heat a target volume of the gas adjacent to, forward of, and along the entirety of the pressure surface of the lifting body, sufficiently to increase the speed of sound in the gas within the target volume, relative to the speed of sound in the gas outside the target volume; and
an energy source carried by the aircraft and coupled to the energy delivery system to power the energy delivery system.

11. The system of claim 10 wherein the lifting body includes a wing.

12. The system of claim 10 wherein the lifting body includes a blended wing-body.

13. The system of claim 10 wherein the lifting body includes a propeller.

14. The system of claim 10 wherein the lifting body includes a rotor.

15. The system of claim 10 wherein the lifting body is airborne during operation.

16. The system of claim 10 wherein the energy delivery system includes a laser.

17. The system of claim 10 wherein the energy delivery system includes an electrical energy discharge system.

18. The system of claim 17 wherein the electrical discharge system operates a frequency of 13.56 GHz.

19. The system of claim 17 wherein the electrical discharge system operates a frequency of 2.4 GHz.

20. The system of claim 17 wherein the electrical discharge system operates a frequency of 61 GHz.

21. The system of claim 17 wherein the energy delivery system includes a first electrode and a second electrode.

22. The system of claim 21 wherein at least one of the electrodes is positioned at or below a leading edge tip of the lifting body.

23. The system of claim 21 wherein at least one of the electrodes is positioned at or below a stagnation point of the lifting body.

24. The system of claim 10, further comprising a propulsion system carried by the lifting body and having at least one thrust-producing element.

25. A method for operating an aircraft having a lifting body, the lifting body having an upper surface comprising a suction surface and a lower surface comprising a pressure surface positioned opposite the suction surface, the method comprising:
activating a heat source onboard the aircraft;
while the lifting body of the aircraft is aloft, heating air, via the heat source, in a target volume offset downwardly from the pressure surface of the lifting body, to decrease the density of the air; and
at the target volume, reflecting a shock wave produced by the lifting body to impinge the shock wave on the lower surface and increase air pressure at the pressure surface.

26. The method of claim 25 wherein the shock wave is a first shock wave, and wherein the method further comprises generating a second shock wave from the target volume to further increase the air pressure at the pressure surface.

27. The method of claim 25 wherein the target volume is 1 mm thick or less.

28. The method of claim 25 wherein heating the air includes heating the air via a guided energy discharge.

29. The method of claim 25, further comprising aligning the target volume with the local air flow direction.

30. A vehicle system, comprising:
an aircraft having a lifting body, the lifting body having an upper surface comprising a suction surface and a lower surface comprising a pressure surface positioned opposite the suction surface;
an energy delivery system carried by the lifting body and positioned to heat a target volume of gas offset downwardly from the pressure surface of the lifting body sufficiently to decrease a density of the gas within the target volume and reflect a shock wave generated by the lifting body to impinge the shock wave on the lower surface and increase air pressure at the pressure surface; and
an energy source carried by the aircraft and coupled to the energy delivery system to power the energy delivery system.

31. The system of claim 30 wherein the lifting body includes a wing.

32. The system of claim 30 wherein the lifting body includes a blended wing-body.

33. The system of claim 30 wherein the energy delivery system includes a laser.

34. The system of claim 30 wherein the energy delivery system includes an electrical energy discharge system.

* * * * *